United States Patent

Guilfoyle

[15] 3,690,604
[45] Sept. 12, 1972

[54] PARACHUTE STOWAGE AND DEPLOYMENT

[72] Inventor: Le Roy F. Guilfoyle, Point Pleasant, N.J.

[73] Assignee: Parachutes Incorporated, Orange, Mass.

[22] Filed: Feb. 2, 1970

[21] Appl. No.: 7,939

[52] U.S. Cl. ............................................. 244/148
[51] Int. Cl. ........................................... B64d 17/40
[58] Field of Search ................. 244/147–149, 152, 244/138, 142, 145

[56] References Cited

UNITED STATES PATENTS

| 2,537,152 | 1/1951 | Moran | 244/148 |
|---|---|---|---|
| 2,979,294 | 4/1961 | Buss | 244/148 |
| 3,506,225 | 4/1970 | Snyder | 244/149 |
| 2,583,905 | 1/1952 | Thompson | 244/148 |
| 2,508,754 | 5/1950 | Frieder et al. | 244/148 |
| 2,978,212 | 4/1961 | Istel et al. | 244/148 |
| 3,437,295 | 4/1969 | Istel et al. | 244/148 |
| 2,998,950 | 9/1961 | Fritz et al. | 244/148 |
| 3,540,684 | 11/1970 | Snyder | 244/149 |

FOREIGN PATENTS OR APPLICATIONS

| 1,037,970 | 8/1966 | Great Britain | 244/147 |

Primary Examiner—Milton Buchler
Assistant Examiner—F. K. Yee
Attorney—Joseph M. Fitzpatrick, John Thomas Cella, Charles B. Cannon, Lawrence F. Scinto, Carroll G. Harper, Charles J. Burnet and Robert L. Baechtold

[57] ABSTRACT

Stowage and deployment arrangements for parachutes according to which a parachute canopy is first folded and a securing means, forming the deployment device, is wrapped about the folded canopy and secured to itself by detachable pull apart securing means and the parachute suspension lines are reefed outside the device in a manner such that the device will not separate or allow release of the canopy until the suspension lines are fully extended. Novel suspension line reefing arrangements are also described which hold the lines reefed until a pull is exerted on a trigger line from the deployment device.

23 Claims, 29 Drawing Figures

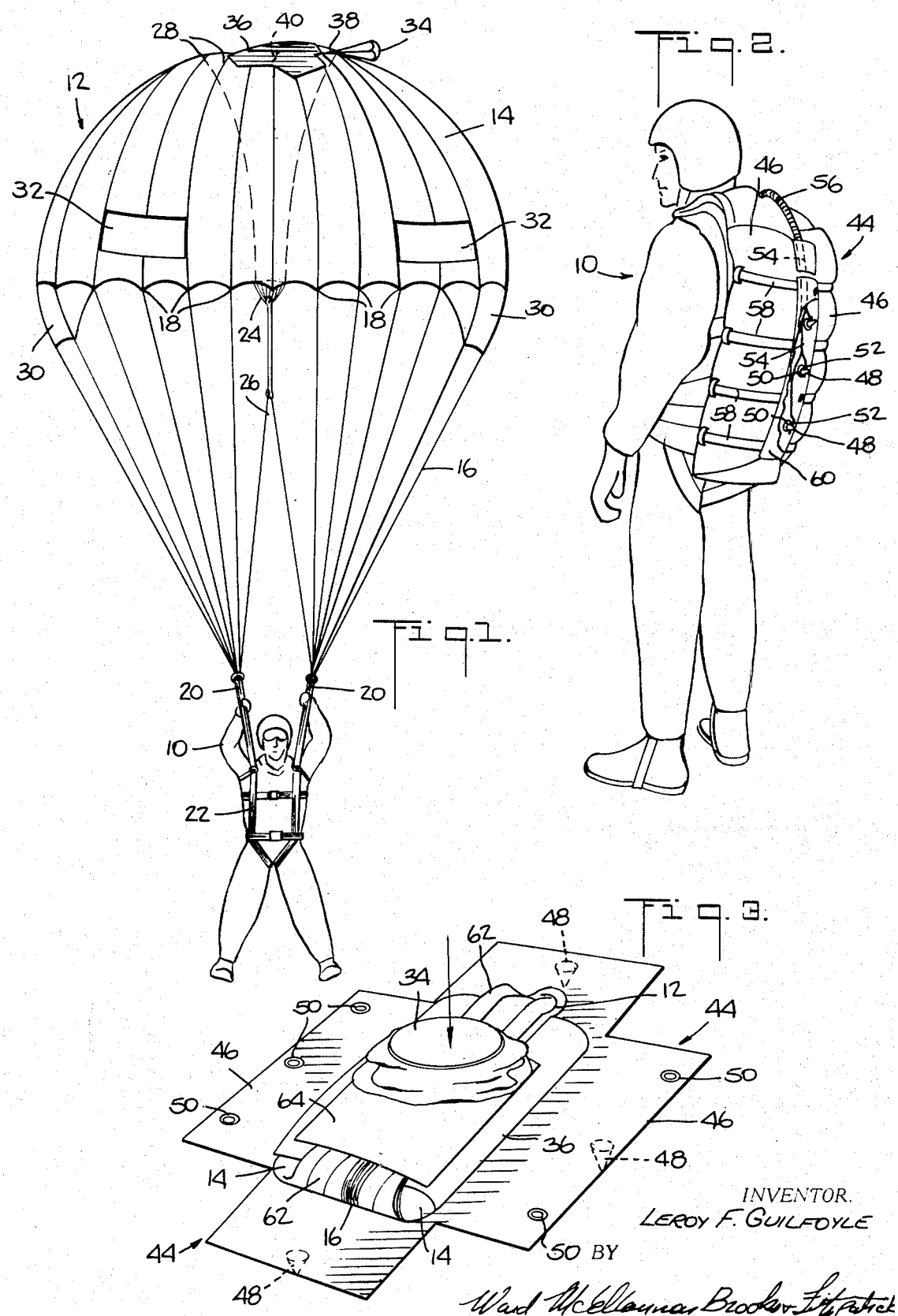

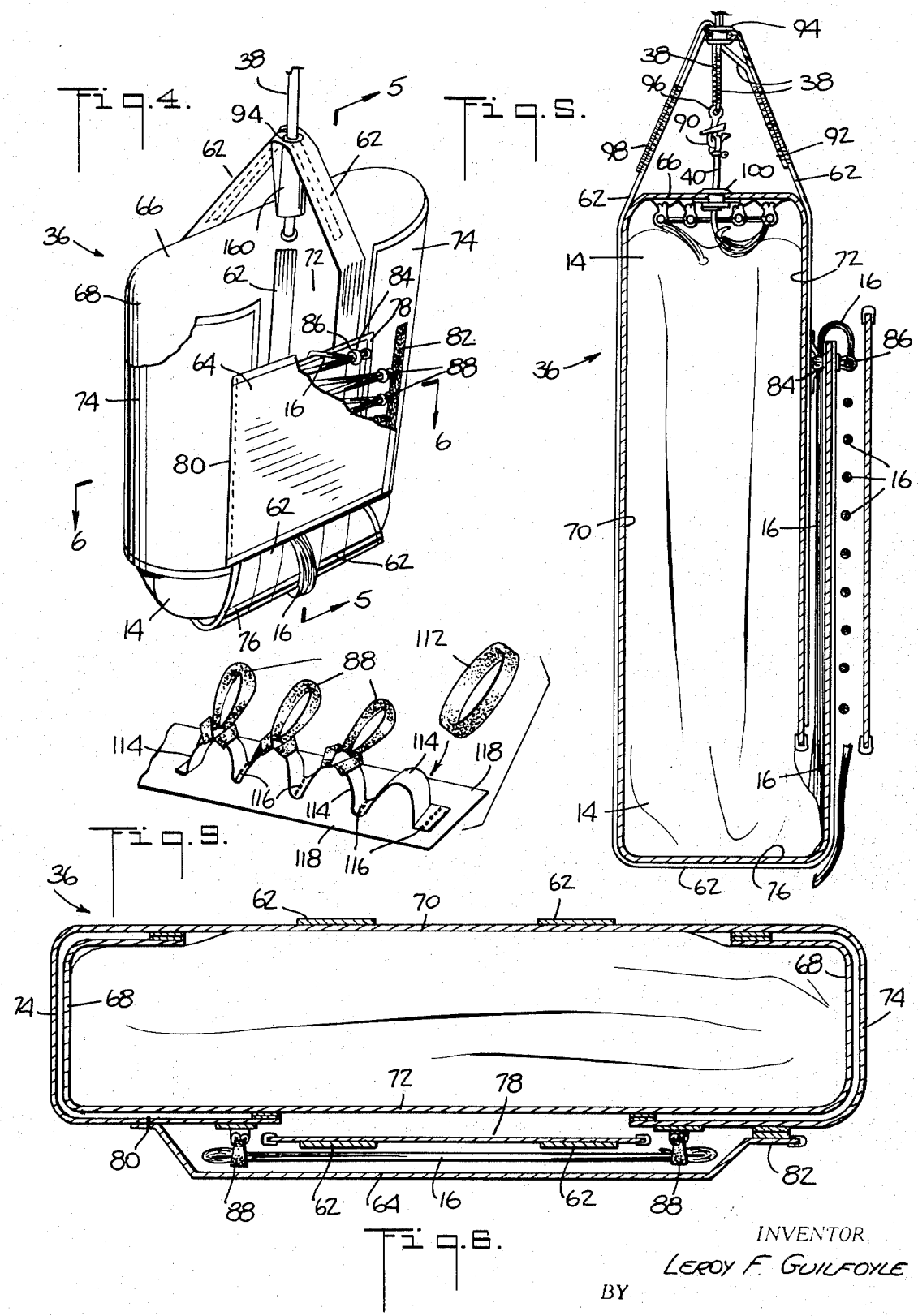

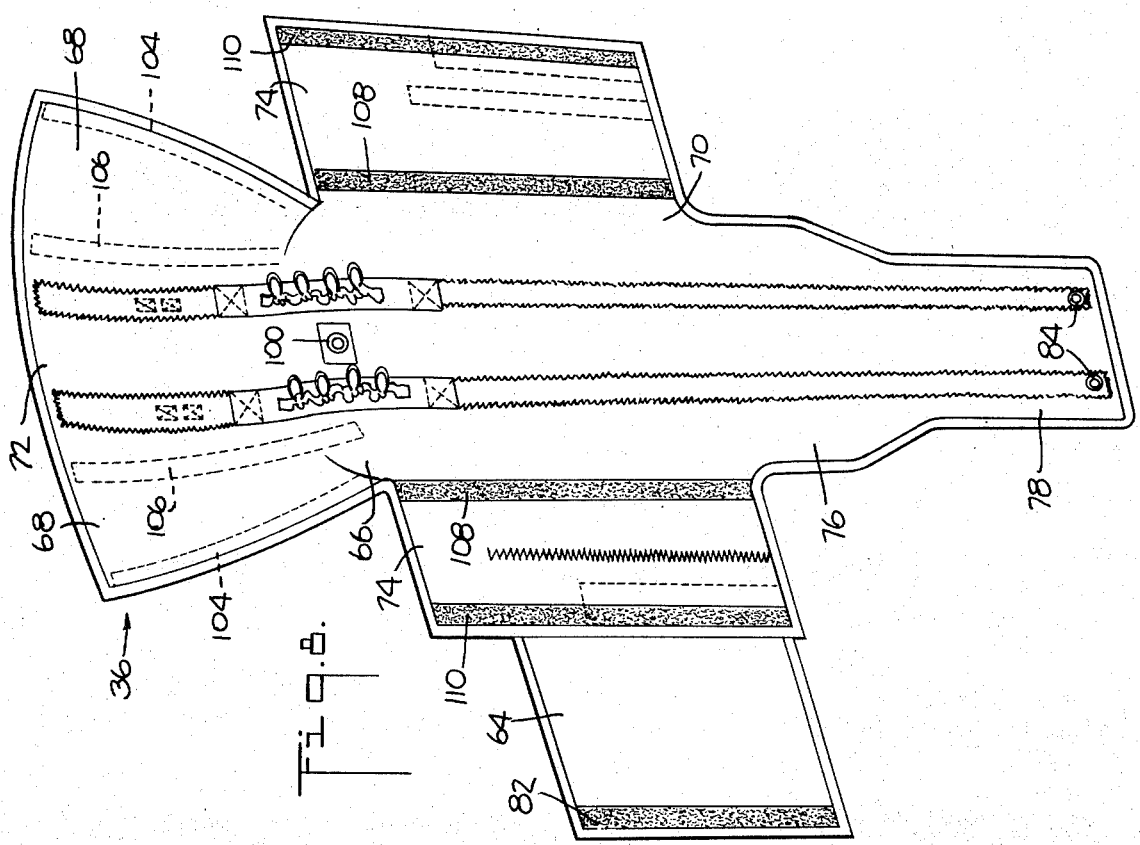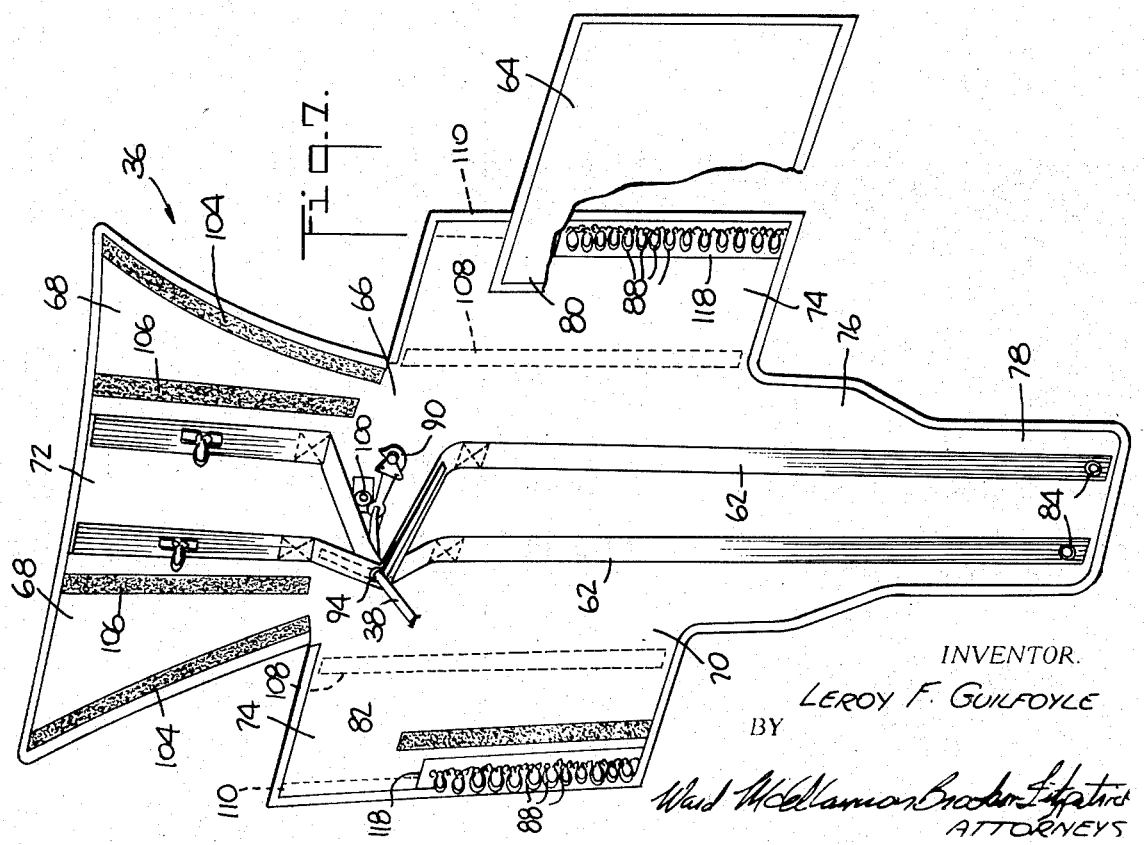

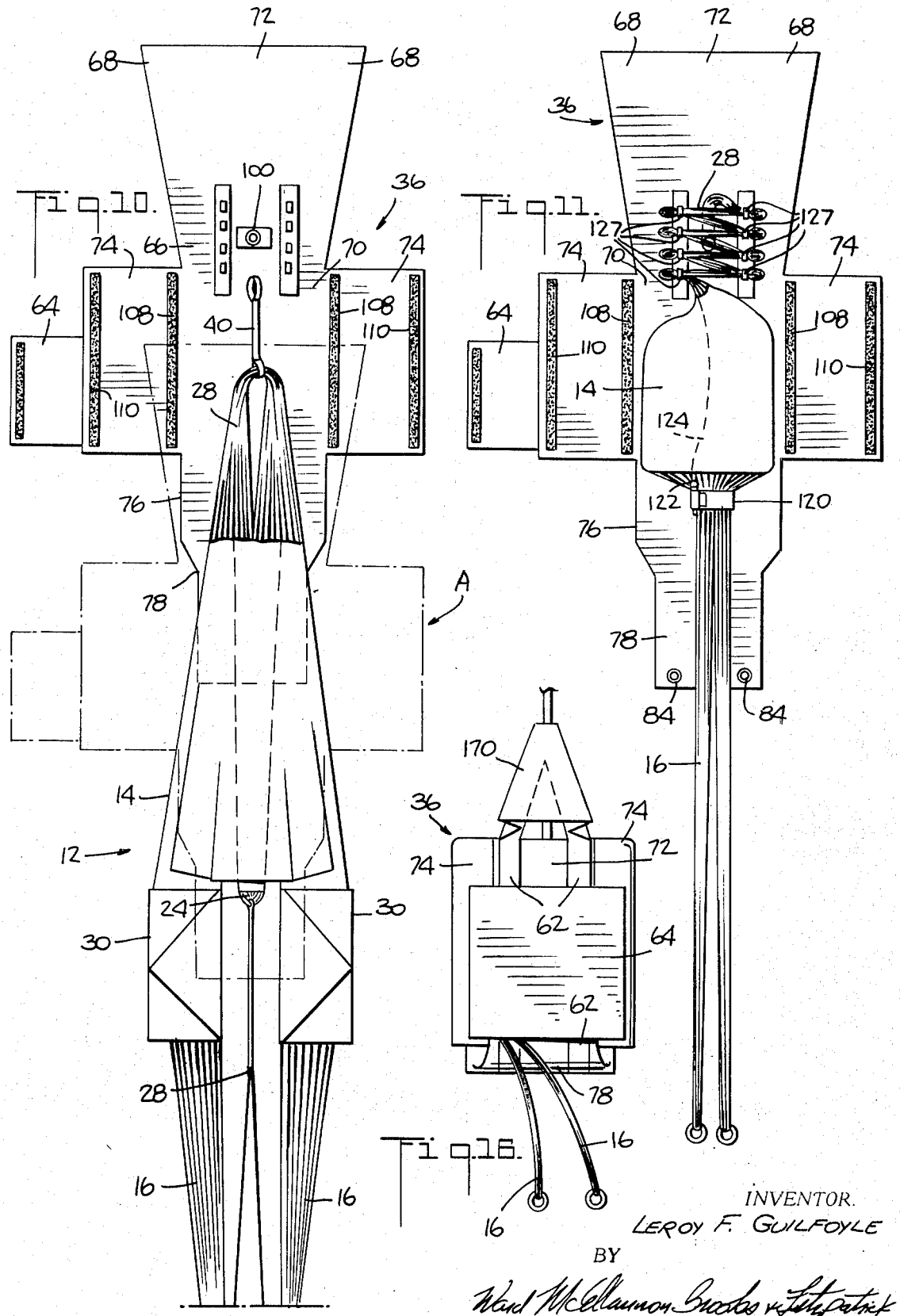

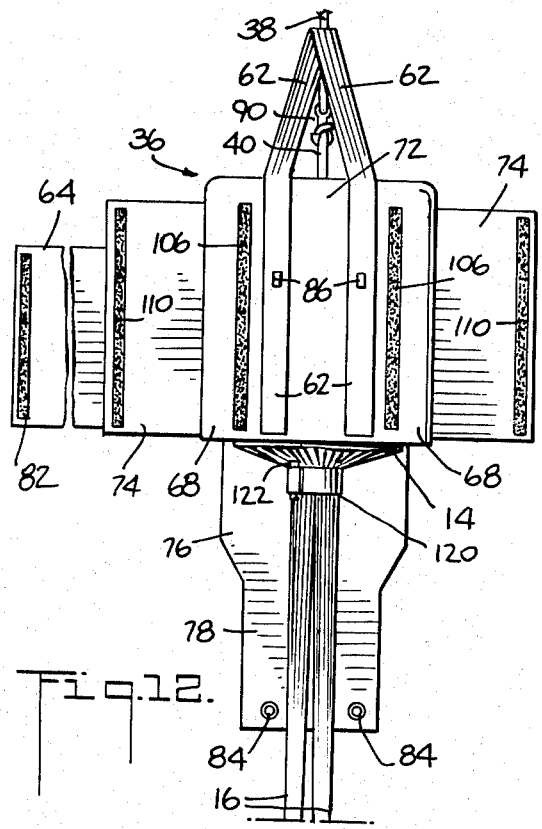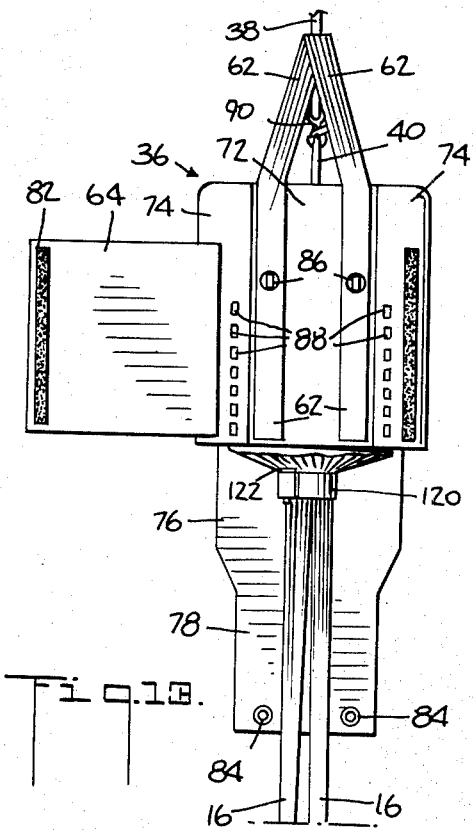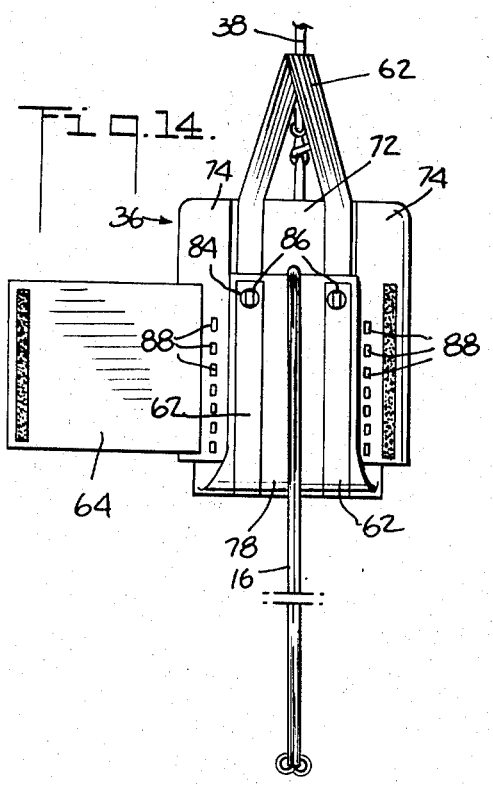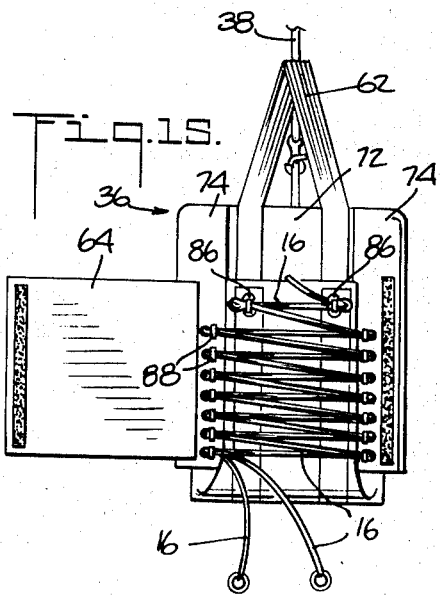

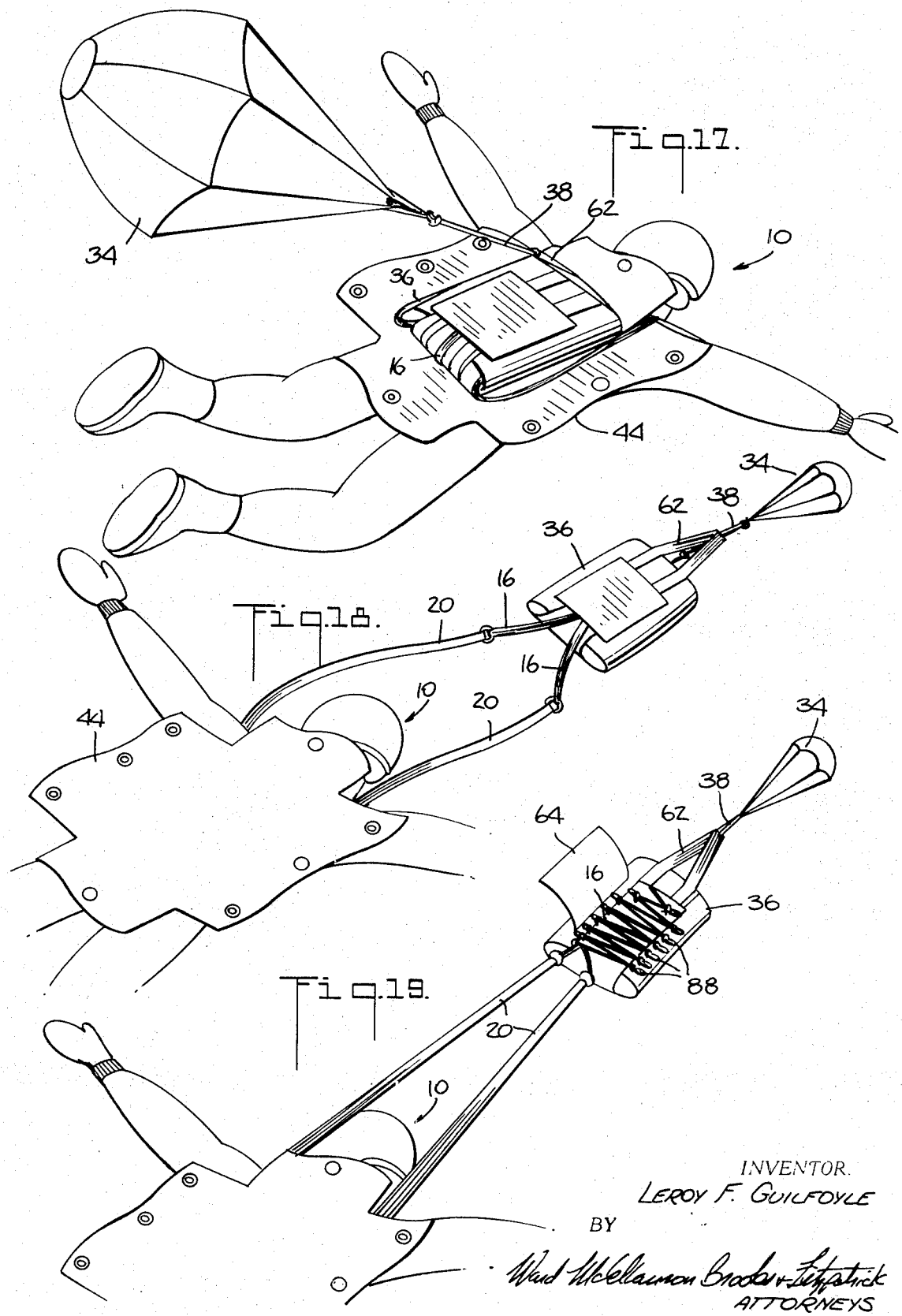

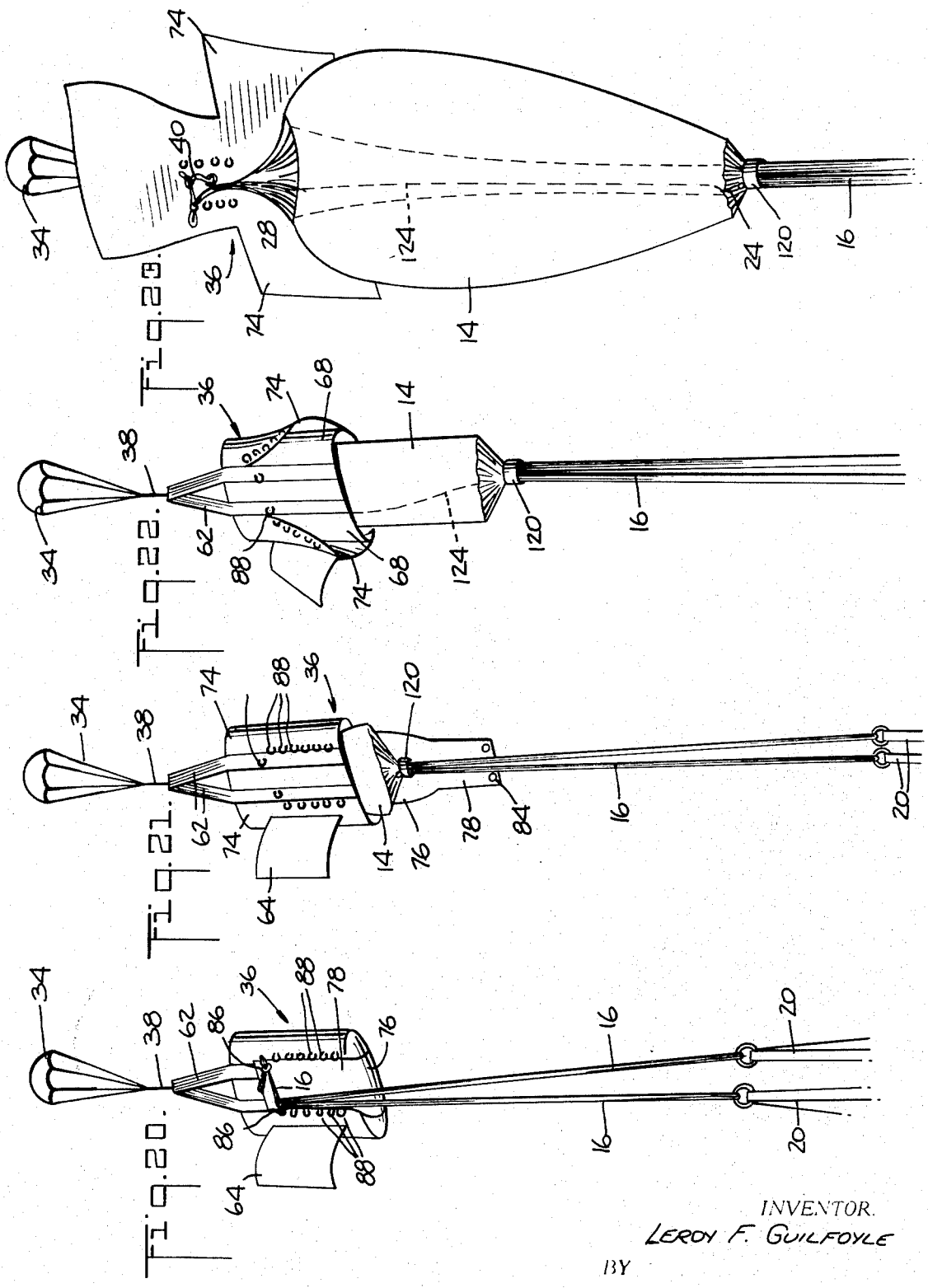

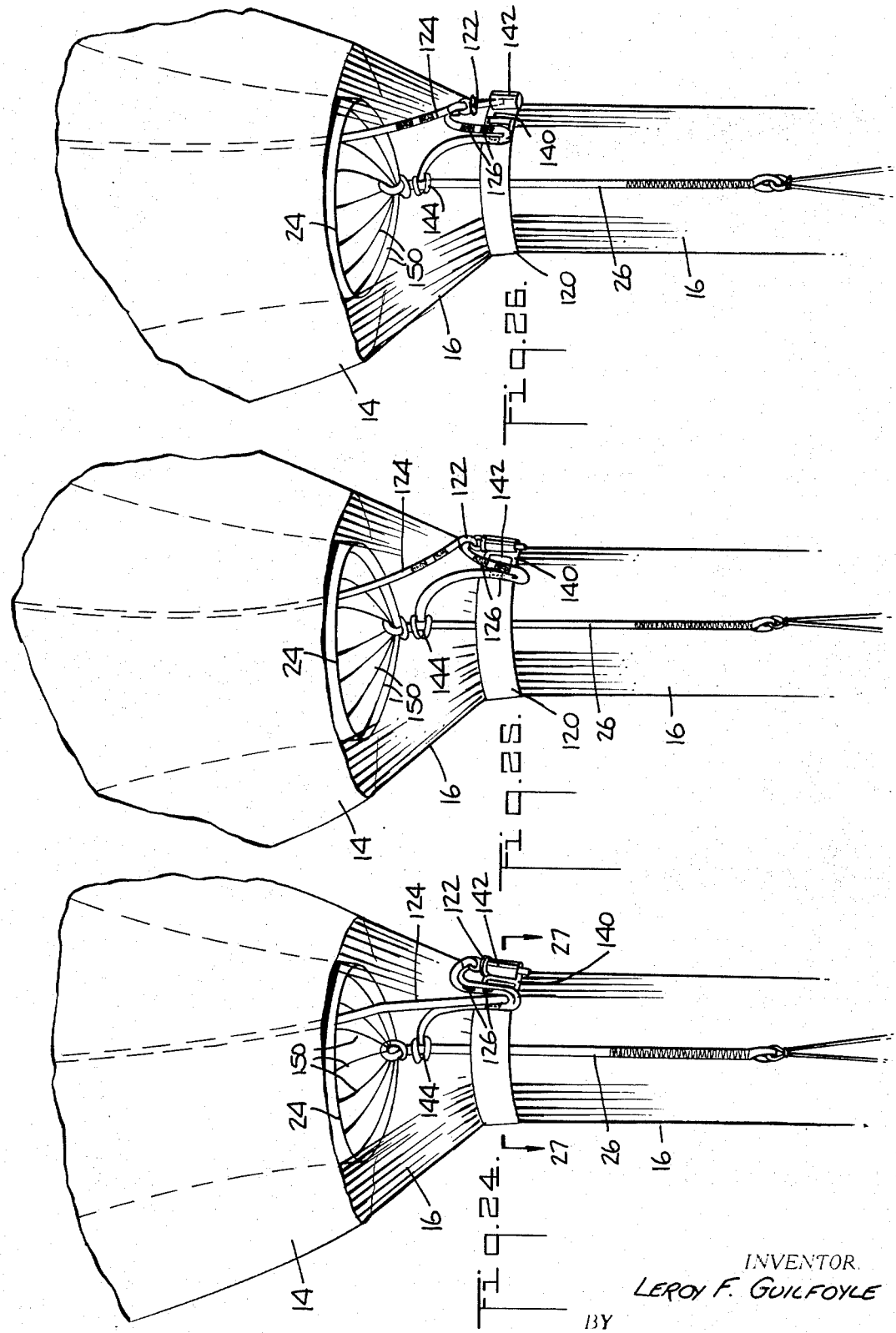

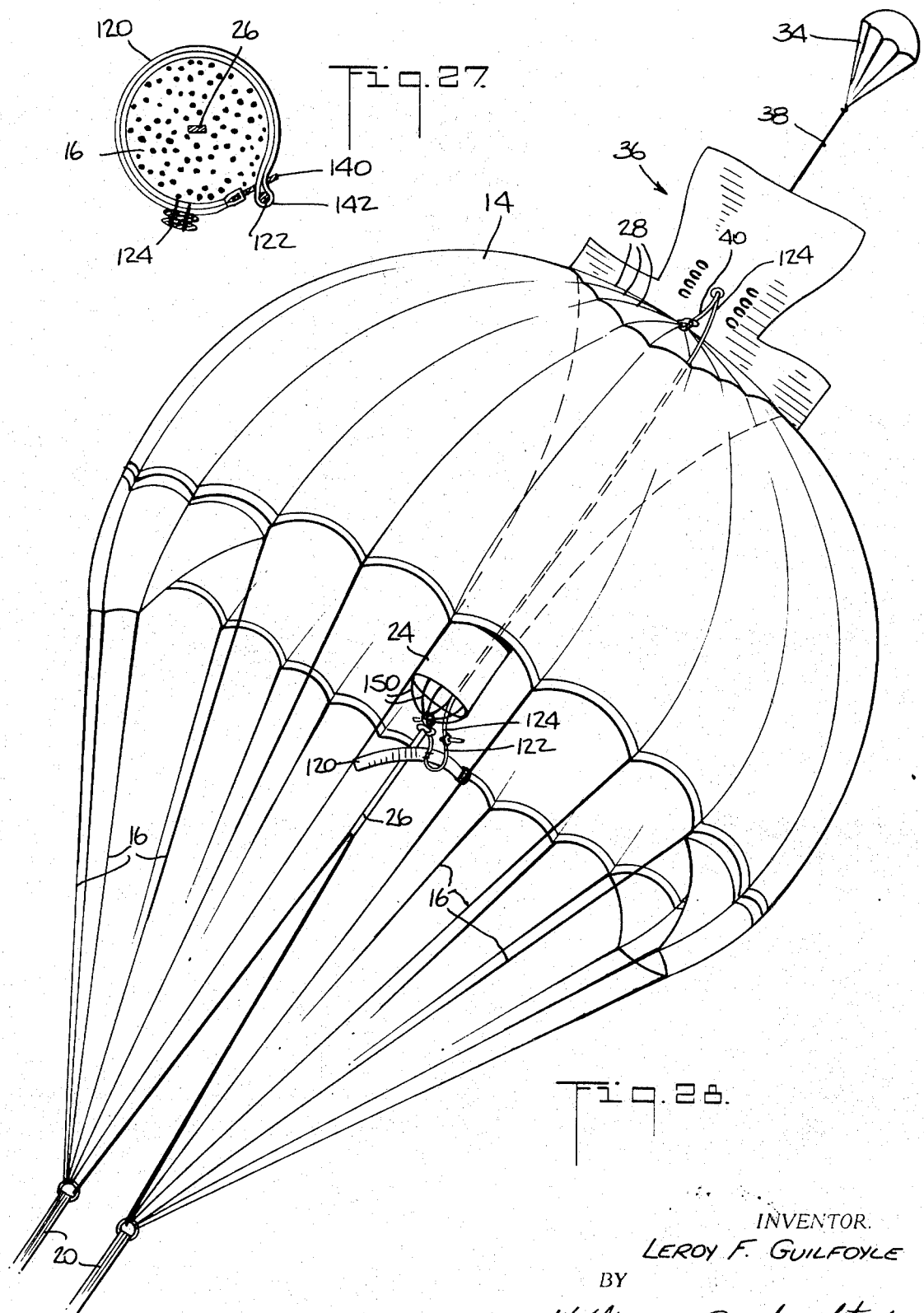

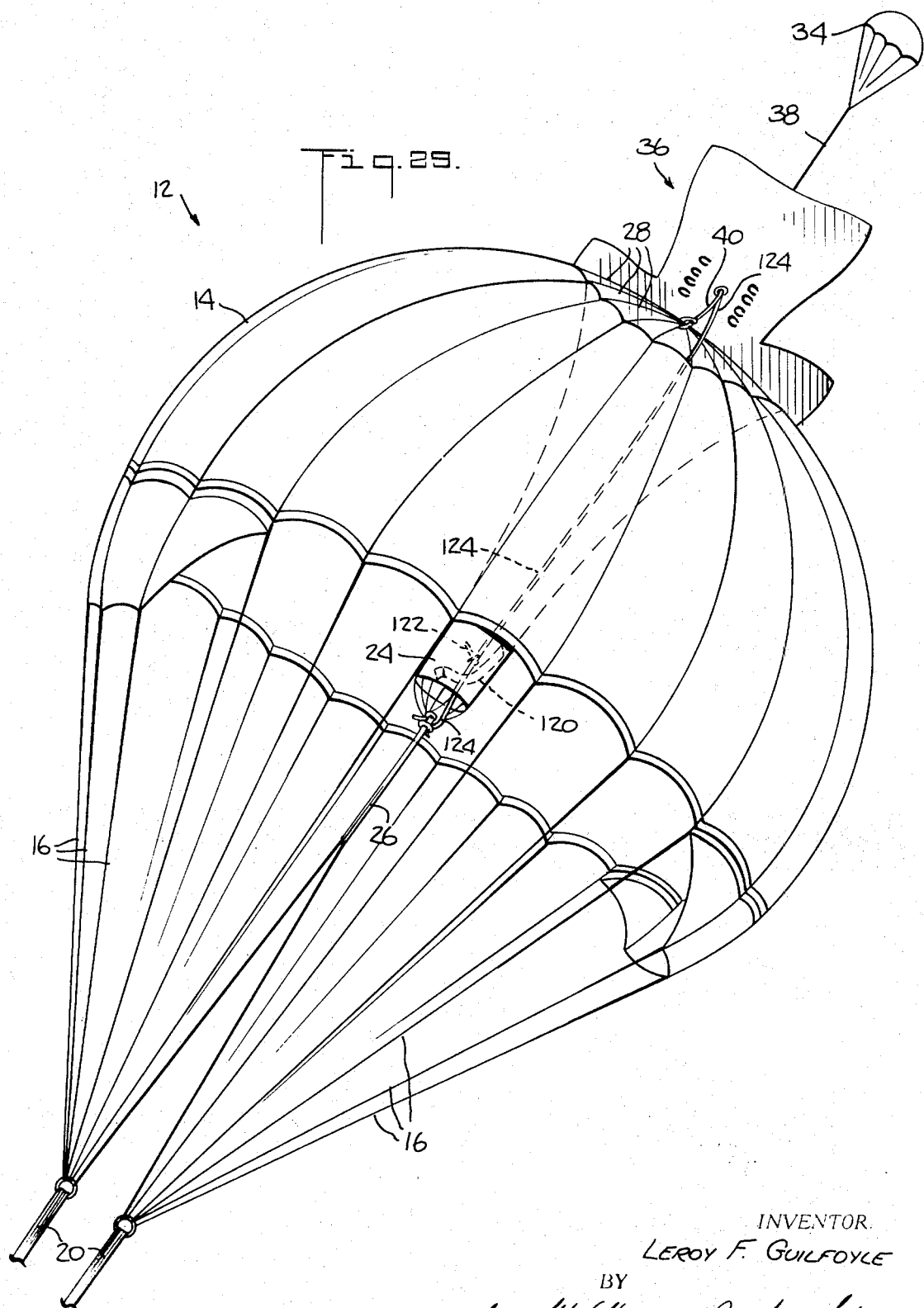

3,690,604

PARACHUTE STOWAGE AND DEPLOYMENT

This invention relates to the stowage and deployment of parachute type devices, and more particularly it concerns novel arrangements whereby such devices are enabled to undergo an effective and reliable transition from a compact stowed condition to a fully opened condition as they fall through the atmosphere.

As used herein, the term "parachute" includes any flexible aerodynamic retardation device comprising a canopy made of a flexible sheet-like material such as nylon fabric and a plurality of suspension lines, each extending from one of several displaced locations about the canopy to a common harness which holds a person or an object to be lowered through the atmosphere. The canopy, when fully deployed, may be umbrella-shaped according to the traditional parachute configuration; and the suspension lines, in such case, extend downwardly from points about the outer peripheral edge or skirt of the canopy. In other cases, the canopy may be shaped more like a wing and may be of a flatter configuration to provide aerodynamic characteristics which enable gliding and maneuverability during descent. In these last-mentioned cases, the suspension lines may be attached, not only to the peripheral edges of the canopy, but also to locations at the edges of various panels thereof and to other intermediate points in order to maintain a desired canopy configuration during descent.

In still further cases, the canopy may be umbrella shaped, but with a depressed apex having centerlines extending down to the parachutist.

In nearly all parachute applications, it is desirable or necessary that the canopy and suspension lines be stowed or folded into a compact package until the person or object to which the parachute is secured has jumped or been thrown free of an aircraft and is actually falling through the atmosphere. Of course, once this situation occurs, it then becomes quite important that the canopy and suspension lines unstow and deploy effectively and reliably to a fully opened condition. Once the canopy has been opened it will, depending upon its configuration, either capture air and produce a drag to slow the descent of the person or object in the harness, or it will actually exhibit an airfoil effect whereby it will glide through the air with a forward velocity that may produce some aerodynamic lift.

In the past, various devices have been developed to assist in the deployment of parachutes. The two most common of these deployment devices are the deployment bag and the deployment sleeve.

The deployment bag of the prior art is essentially an open fabric bag used in inverted position with the opening facing downwardly. In stowing with the deployment bag, the canopy of the parachute is first extended with its skirt bunched together or pleated while the suspension lines, which are together, extend down away from the canopy. The resulting elongated arrangement is then stuffed into the bag beginning with the uppermost portion of the canopy and continuing with S-shaped or accordion folds. The suspension lines are then reefed in loops on the outside of the bag. A pilot parachute is attached by a bridle to the closed end of the bag, and a retainer line is connected from the inside of the bag to the apex of the parachute canopy. This assembly, including the pilot parachute, is then enclosed in a parachute container which is secured, along with the harness, to the user.

The deployment sleeve of the prior art is an elongated fabric sleeve that resembles a stocking. In stowing with the sleeve, the parachute canopy is extended as in the case with the deployment bag. However, the sleeve at this point is pulled down over the elongated canopy until it covers the entire canopy. The suspension lines are stowed in loops near the skirt end of the sleeve and the sleeve itself is then folded over in a series of S-shaped or accordion folds. A pilot parachute is attached, by means of a bridle, to the upper end of the sleeve; and a retainer line is fastened to extend from the sleeve to the canopy of the parachute. The assembly, including the pilot parachute, is then enclosed in a parachute container as in the case of the deployment bag.

In the deployment of parachutes using the prior art deployment bag and deployment sleeve, the general idea is to have the pilot parachute pull on the bag or sleeve so that the parachute canopy and suspension lines are pulled away from the user; and at the same time the deployment device is pulled off from the canopy, thereby enabling it to fill with air in a proper position up and away from the user.

Both the prior art deployment bag and the deployment sleeve possess a number of inherent disadvantages, both in regard to stowage and in regard to deployment of parachutes. As regards stowage, both devices are limited to parachutes of one canopy size and configuration. Also, the manner in which the canopy is foled cannot be varied using these prior art devices. Another stowage difficult which is presented by prior art deployment bags and sleeves is that of obtaining neat and uniform folds of the canopy material inside the device. The canopy may be neatly folded or pleated prior to insertion into the bag or sleeve; however, the process either of stuffing the canopy into the bag or of pulling the sleeve over the canopy usually causes some derangement of the folds and pleats. This, of course, can have adverse effects on deployment and opening of the canopy. It is also important for proper deployment that the tightness of the deployment device on the folded canopy be controlled. The sleeves and bags of the prior art will not permit control of tightness with respect to the canopy.

Considering now the deployment characteristics of prior art bags and sleeves, it has been found that both possess a number of undesirable characteristics. In the case of the sleeve, the sequence of deployment requires that the sleeve become fully extended prior to unstowage and extension of the suspension lines. Thus, the sleeve unfolds near the user with a consequent danger of fouling. In the case of the prior art deployment bag, the entire canopy may drop out of the bag in fully folded condition and a consistant sequence of opening is not achieved. In either situation, there is a real danger of a greater or lesser portion of the canopy becoming tangled with some of the suspension lines so that upon completion of deployment, a "line-over" condition will result. This condition prevents full extension of the canopy with corresponding adverse aerodynamic effects. In addition, the fouled suspension lines and the canopy itself may become damaged.

Another difficulty which may occur in deployment from prior art sleeves is a locking action whereby the airstream produced during falling may begin to inflate the canopy before it is removed from the deployment device and while it is in a condition that such inflation causes it to press tightly against the sides of the deployment device and lock inside it, thereby preventing completion of deployment.

A further disadvantage encountered in the use of prior art deployment bags and sleeves is that they produce substantial drag on the parachute following deployment. Moreover, depending on the resulting configuration of the sleeve or by following deployment and the position it happens to assume relative to the parachute canopy, a variable aerodynamic effect will be produced. Thus, the descent characteristics of the parachute are not determined until after deployment. This makes precision parachuting, i.e., toward a predetermined target on the ground, particularly difficult.

The present invention serves to avoid the above-noted disadvantages of prior art deployment bags and sleeves. With the arrangements of the present invention, it is possible with a single deployment device to accommodate several different sizes and configurations of parachute canopy. Moreover, the canopy may be folded in any desired configuration, and the neatness of its folds will be preserved during stowing. Also, the tightness of stowage may be controlled with the present invention.

The present invention, moreover, permits deployment of parachutes with a degree of reliability and effectiveness heretofore unattainable with prior art deployment bags and sleeves. The chances of fouling between the suspension lines and the canopy, i.e., "lineover," and the chances of entanglement of the parachute system and the user, is substantially reduced with the present invention. The deployment arrangements of the present invention addiitionally ensure that the suspension lines of the parachute are fully played out before the parachute canopy begins to unfold.

According to one aspect of the present invention, the parachute canopy is first fully folded according to a desired pattern and after this folding is completed, flexible securing means are engaged about the canopy. The parachute suspension lines are then stowed in such a manner that the securing means cannot become disengaged until the suspension lines are completely unstowed. A pilot parachute is connected, by means of a bridle line, to the securing means so that when the pilot parachute deploys it pulls on the entire folded canopy as a compact unit. The canopy thus will not begin to unfold and separate from the securing means until the suspension lines are extended their full length from the user to the canopy. The pilot parachute is also connected to the main parachute canopy in such a manner that when the deployment device separates or opens the pilot parachute pull is shifted to a direct pull on the upper end of the canopy. Thus the pilot parachute itself extends the canopy after it has extended the suspension lines.

According to another aspect of the present invention, there is provided a novel deployment device comprising a canopy secured means formed of separate elements which are wrapped about the canopy after the canopy has been fully folded. These elements are secured to each other by means of the suspension lines to hold the canopy until the suspension lines are extended. The securing means elements then may separate to free the canopy.

As illustratively embodied, the securing means comprises a plurality of flap elements of fabric or similar material which, when secured to each other, form a closed container within which the parachute canopy is maintained in folded condition. The flaps are arranged to be secured in such manner that they can separate by the action of the airstream during deployment and/or by the opening forces of the canopy itself exerted against the container.

According to a further feature of the invention, novel retention arrangements are provided which serve to hold the securing means and the pilot parachute in a position relative to the fully deployed canopy where their aerodynamic effects will be minimized or at least made predictable. These novel retention arrangements comprise retainer lines which hold the canopy securing means in substantially flattened condition against the top of the opened parachute canopy. This minimizes interaction of the securing means and the surrounding airstream, and it restricts the positioning of the canopy securing means relative to the opened canopy.

According to a still further feature of the present invention, there are provided novel suspension line reefing arrangements by which the control of complete canopy opening is greatly improved. In the past, there have been provided suspension line reefing means comprising a length of elastic webbing which encircled all of the suspension lines and held them together at a location about 1 inch below the canopy skirt. A loop in one end of the web was passed through a buckle opening in the other end to hold the reefing means encircled about suspension lines. One of the suspension lines was then bent back on itself and passed through the reefing device loop to lock it in place. During parachute deployment, the reefing device would hold the suspension lines together until the tension on the one line pulled it out of the reefing device loop. This allowed the lines to spread as the canopy filled with air.

The prior art reefing arrangement had certain disadvantages, the primary one being that it was not responsive to canopy condition, but rather it was responsive only to suspension line tension. As a result, the device was limited to use on parachutes which are deployed in the canopy first configuration.

The present invention overcomes this difficulty and permits greater control of unreefing as well as more reliable unreefing. This is achieved, according to the present invention, by providing a reefing band which wraps about the suspension lines and securing means holding the band together. The securing means includes a release element responsive to pulling forces to allow the band to open and release or unreef the suspension lines. A trigger line is connected between the release element and the deployment device, and when the deployment device comes off from the canopy and the canopy is extended, the trigger line will pull on the release element to obtain unreefing.

Various further and more specific objects, features and advantages of the invention will appear from the description given below, taken in connection with the accompanying drawings, illustrating by way of example a preferred form of the invention.

FIG. 1 is an elevational view of a fully opened and extended parachute supporting a parachutist during descent through the atmosphere;

FIG. 2 shows a parachutist wearing a completely stowed parachute prior to descent;

FIG. 3 is a perspective view illustrating an opened parachute pack exposing a folded parachute and parachute deployment device embodying the present invention;

FIG. 4 is a perspective view, partially cut away, illustrating the deployment device of FIG. 3 in its parachute-containing condition;

FIG. 5 is an enlarged section view taken along 5—5 of FIG. 4;

FIG. 6 is an enlarged section view taken along 6—6 of FIG. 4;

FIG. 7 is a perspective view illustrating the fully opened deployment device (less parachute) from the outer side thereof;

FIG. 8 is a view similar to FIG. 7, but showing the fully opened device from the inner side thereof;

FIG. 9 is a fragmentary view illustrating the stowage loop construction incorporated in the deployment device of FIGS. 4-8;

FIG. 10 is an elevational view illustrating the first step of stowage of a parachute with the deployment device of FIGS. 4-8;

FIG. 11 is a view similar to FIG. 10 illustrating a second step in the stowage of the parachute;

FIGS. 12-16 are similar views illustrating the successive steps following those shown in FIGS. 10 and 11, of stowing a parachute utilizing the deployment device of FIGS. 4-8;

FIGS. 17-23 are perspective views illustrating a series of steps which take place in the deployment of a parachute utilizing the deployment device of FIGS. 4-8;

FIGS. 24-26 are a series of enlarged fragmentary views showing in detail the suspension line reefing arrangement of the preceding figures and illustrating the sequence of suspension line deployment achieved with the reefing arrangement;

FIG. 27 is a section view taken along line 27—27 of FIG. 24; and

FIGS. 28 and 29 are perspective views showing the manner in which the reefing and deployment devices become retained following parachute deployment.

In FIG. 1, a parachutist 10 is shown suspended from a parachute 12 which lowers him through the atmosphere at a safe rate of descent. The parachute 12 comprises an upper canopy 14 which may be of any lightweight flexible sheet material, such as nylon fabric, and a plurality of suspension lines 16 which extend downwardly from various displaced locations 18 on the canopy 14. The lower ends of the suspension lines 16 are connected to a pair of risers 20; and these risers in turn are secured to a harness 22 attached to the body of the parachutist 10. As the parachutist 10 descends through the atmosphere, his weight pulls down on the canopy 14 and this in turn, depending upon its particular configuration, will interact with the surrounding atmosphere to glide through it or simply be dragged down through it, in any event, providing a safe rate of descent for the parachutist 10.

The particular canopy shown in FIG. 1 differs from the conventional umbrella-shaped canopies in that it is depressed or pulled downwardly in the center thereof so as to provide an inverted apex 24. A pair of center lines 26 extend down from the apex to the risers 20 and serve to maintain the depression of the apex during descent. This will assist in controlling and maneuvering of the parachute during descent. A plurality of crown lines 28 extend across the top of the canopy 14 to restrict its lateral extent, thereby enabling the apex 24 to remain inverted, even when the center lines 26 are not pulled down.

It will also be noted that the canopy 14 is provided with various stabilization panels 30 which extend down slightly below the lower edge or skirt of the canopy 14; and there are also provided various slots or openings 32 at strategic locations in the canopy 14 which permit greater control of the steerability of the parachute.

The parachute shown in FIG. 1 is illustrative of the modified canopy-type parachutes which permit greater control and maneuverability than the earlier umbrella-shaped parachutes. One make of parachutes employing a configuration such as described in FIG. 1 is known as the Para-Commander parachute. Various other parachutes and canopy configurations have been developed, some using canopies having a flatter configuration than that shown in FIG. 1 and shaped to provide more or less of an air foil effect, thereby to increase the degree of gliding which may be achieved during descent.

While the present invention may be utilized very advantageously for deployment of conventional umbrella-shaped parachutes, it is particularly useful in connection with the stowage and deployment of parachutes of the inverted apex type and other canopy configurations which do not lend themselves so readily to sleeves and bags, since control of staging (i.e., sequencing of the various unstowage events which occur during deployment) must be more closely controlled with these various non-umbrella canopy configurations.

There is also shown in FIG. 1 a pilot parachute 34 and a deployment device 36 (to be described more fully hereinafter) resting on the upper surface of the canopy 14 of the parachute 12. The pilot parachute 34 is connected to the deployment device by means of a bridle 38, and the deployment device 36 in turn is connected by means of a retainer line 40 to the center of the crown lines 28.

The entire parachute assembly prior to deployment is stowed, as illustrated in FIG. 2, in an outer pack 44 worn by the parachutist 10. The pack 44, which may be secured to the harness 22 in any convenient manner, comprises a number of flaps 46, the outer ones of which overlap along a line down the center of the back of the pack 44. Under lying flaps are provided with small metal cones 48 which project outwardly through grommets 50 along the edges of the overlying flaps. The grommets are held down over the cones 48 by means of pins 52 which pass through holes (not shown) crossways through the cones 48. The pins 52 are connected to a common ripcord 54, and this in turn passes through a ripcord housing 56 to the front of the parachutist 10. When the parachutist pulls on the ripcord 54, the pins 52 are pulled out from the cones 48 allowing the grommets and their associated flaps to come up off the cones. A plurality of elastic pack-opening bands 58 are stressed to pull the various flaps 46 back away from each other when the grommets 50 are released from the cones 48. This exposes the stowed parachute, its deployment device and a pilot parachute. The cones and grommets are temporarily protected by a cone and pin flap 60, shown partially cut away in FIG. 2.

When the outer pack 44 is opened for deployment of the parachute, as described above in connection with FIG. 2, the outer pack 44 assumes the configuration shown in FIG. 3. As can be seen in FIG. 3, the interior of the outer pack 44 is nearly completely taken up by a package-like arrangement comprising the deployment device 36. The folded parachute canopy 14 is contained within the deployment device 36; and the bottom corners of the canopy can be seen to be exposed at the bottom end of the device 36.

The pilot parachute 34 is shown in FIG. 3 to be flattened down on top of the deployment device 36. The pilot parachute is provided with an internal coil spring (not shown) which, when the pack 44 is opened, causes the pilot parachute 34 to spring out from inside the pack 44 and automatically assume an opened condition. The bridle 38, which connects the pilot parachute 34 to the deployment device 36, is hidden under the pilot parachute in the arrangement shown in FIG. 3. It is attached, however, to a pair of heavy duty reinforcing bands 62, which are sewn to, and extend completely around, the deployment device 36. Also, as can be seen in FIG. 3, the various suspension lines 16 are shown in stowed arrangement coming out of a line stowage cover panel 64 which lies across the upper surface of the deployment device 36. As shown, these suspension lines extend around under the deployment device 36 and are attached to the risers 20 thereunder.

The construction and arrangement of the parachute deployment device 36 can be seen in FIGS. 4-6. As can be seen, the device comprises a number of overlapping generally rectangular panels which, in assembly, form a substantially closed package within which the parachute 12 is maintained. The panel arrangement includes a top panel 66 which is integral with a pair of innerside panels 68. The top panel 66, as shown in FIG. 5, is also integral with and extends out from a generally rectangular central back panel 70. A main front panel 72 extends downwardly from the front edge of the top panel 66. As shown in FIG. 6, a pair of outer side panels 74 are formed as extensions of the central back panel 70 and extend forwardly therefrom overlapping the innerside panels 68. Similarly, a bottom panel 76 extends downwardly and outwardly from the bottom of the central back panel 70, while a bottom panel extension 78 extends upwardly over the front panel 72 between the edges of the two outer side panels 74.

The line stowage cover panel 64, as shown in FIGS. 4 and 6, is sewn along a line 80 to one of the outer side panels 74 and extends across and is detachably secured to the other side panels by means of a pull apart connection 82. Preferably, this pull apart connection 82, which forms a releasable securing means, comprises materials which exhibit mechanically adhesive characteristics similar to that exhibited by burdock burrs. These materials involve two elements, a first element having microscopic burr-like projections and of a harder material along with a cooperating second element having loops formed of closely packed and twisted fibers of a softer material. Materials of this nature are sold under the trademark Velcro. Other pull apart elements such as snap fasteners may also be employed; however, materials with which the Velcro trademark is associated are presently preferred.

Near the upper end of the bottom panel extension 78, and toward the opposite corners thereof, there are provided a pair of grommeted openings 84 through which a pair of closure retention loops 86 pass. The retention loops 86 are secured as by sewing, to the front panel 72 immediately adjacent the grommeted openings 84. Additional suspension line stowage loops 88 are secured in rows along the outer edge of each of the outer side panels 74. As can be seen in FIG. 4, in stowage, the stowed-together suspension lines 16 are looped back and forth first through the retention loops 86 and then through the stowage loops 88. These suspension lines, as shown in FIG. 5, extend from the parachute canopy 14 within the deployment device 36 and proceed up between the front panel 72 and the bottom panel extension 78. They then pass over the front of the bottom panel extension and are stowed, as shown in FIG. 4, in the various loops 86 and 88. The suspension lines continue from the stowage arrangement down underneath and behind the deployment device to connect to the risers 20, as shown in FIG. 1.

As can be seen in FIGS. 4 and 5, the reinforcing webbing 62 is sewn to and extends in two strips about the deployment device 36 in the form of a sling. The webbing 62 is not attached to the top panel 66, but instead it extends upwardly a few inches above the top panel; and there the two strips of webbing 62 are sewn together.

The bridle 38 interconnects the pilot parachute 34 (FIG. 1) with both the deployment device 36 and a quick release hook 90 (FIG. 5) to which the parachute canopy is reefed. One end of the bridle 38, as can be seen in FIG. 5, is sewn at 92 to the underside of the reinforcing webbing extending up over the top panel 66. The bridle then passes up through a grommet 94 in the webbing and up toward the pilot parachute (not shown in FIG. 5). The bridle loops around a ring on the pilot parachute and passes down again through the grommet 94 to the quick release hook 90 located between the top panel 66 and the webbing 62. The bridle passes through an eye 96 in the hook and again extends up through the grommet 94 and is sewn, as at 98, to the outer side of the reinforcing webbing 62. The retainer line 40 loops over the hook 90 and extends down through a top panel grommet 100 to the interior of the deployment device 36 and is there secured to the parachute canopy 14.

Turning now to FIGS. 7 and 8 which show the deployment device 62 in its completely opened or flattened condition, it will be seen that the reinforcing webbing 62 is sewn to and extends in two parallel bands along the front panel 72, the central back panel 70, the bottom panel 76 and the bottom panel extension 78 up to the grommeted openings 84. The webbing 62 extends up away from the top panel 66 and comes together at the grommet 94. The closure retention loops 86 are sewn to the webbing 62 on the front panel 72.

As can be seen in FIG. 7, there are provided, along the outer surface of the inner side panels 68, along the longitudinal edges thereof, front and rear pull apart securing strips 104 and 106. These strips are positioned and arranged to mate with cooperating front and rear pull apart securing strips 108 and 110 positioned respectively along the inner and outer edges of the outer side panels 74 on the opposite side thereof (as shown in FIG. 8).

These pull apart securing strips 104 and 106 and their mating strips 108 and 110, in the preferred embodiment are also preferably of an adhesive-like material which responds to a pulling force for separation. While many such materials may be employed (e.g., snap fasteners), the burr-like mechanically adhesive materials, including those sold under the trademark Velcro are presently preferred.

It will be noted that the configuration of the deployment device 36, as shown in FIGS. 7 and 8, is essentially flat when the securing strips are separated, as occurs upon completion of deployment; and there is therefore virtually no possibility of a folded parachute canopy becoming lodged inside the deployment device. Furthermore, the device is relatively simple to construct, being made of a relatively lightweight fabric material such as nylon; and yet the deployment device has sufficient strength to operate satisfactorily under conditions of high velocity. This last-mentioned characteristic is achieved through the proper use of the reinforcing webbing 62 which completely encircles the device and maintains its container-like configuration at the onset of deployment. Thus, it will be noted that any pull exerted on the deployment device via the pilot parachute bridle 38 will not act to pull apart the strips 104–110, but instead such pulling forces will be absorbed by the reinforcing webbing which ensures that the deployment device will be lifted as a closed integral unit along with the parachute contained within it.

Turning now to FIG. 9, it will be seen that the suspension line stowage loops 88 are formed by attaching rubber bands 112, as by a girth hitch, to loops of webbing 114 which is sewn at discrete locations 116 along a wider webbing 118. The webbing 118 in turn is sewn to the outer side panels 74.

The operation of stowing a parachute utilizing the above-described deployment device is best seen in the sequence illustrated in FIGS. 10–16. As shown in FIG. 10, the stowage operation is begun by placing the deployment device 36 in a flattened condition with its inner side facing upwardly. The parachute 12 to be stowed is arranged in extended condition on top of the deployment device 36. As indicated by the phantom line representation A, the relative position of the deployment device 36 and the parachute canopy 14 may be varied at will. This permits the deployment device 36 to accommodate various types of folding patterns; and it also permits the use of different types and shapes of parachute canopies.

In the illustrative arrangement of FIG. 10, there is shown an inverted apex-type parachute canopy arranged on top of the deployment device 36, with the apex 24 of the canopy extending downwardly inside the canopy. The crown lines 28 extend up to and are secured to the retainer line 40 which in turn passes out through the top panel grommet 100.

The stowage operation is begun as illustrated in FIG. 11, by wrapping a reefing band 120 around the suspension lines 16 to secure them together in a reefed arrangement. A locking pin 122 holds the reefing band 120 in locked condition. The details of this arrangement are shown in FIG. 24. The reefing band and locking pin are both connected to a trigger line 124 which is attached at one end to the center lines 26 near the apex 24. The other end of the trigger line 124 extends up through the apex of the parachute 12 to the retainer line 40, and is hooked with the retainer line on the quick release hook 90. The trigger line is provided with pull apart securing elements 126 such as Velcro tape at locations on opposite sides of the locking pin 122. When the locking pin is inserted in place on the band 120, and the securing elements 126 are fastened together, a loose loop will exist between the pin and band. When, however, sufficient tension is imposed on the trigger line 124, the securing elements 126 will pull apart and the line 124 will pull on the pin 122 to release the band 120 and unreef the lines. This should occur just prior to complete extension of the canopy 14 and crown lines 28. Accordingly, the trigger line length from the pin 122 to its connection to the crown lines is a few inches less than the distance from the center lines 26 to the top of the crown lines when the parachute is fully extended, as in FIG. 10.

The retainer line 40 and the crown lines 28 are then stowed in a series of inner stowage loops 127, as shown in FIG. 11, and the canopy 14 is folded to any desired pattern.

At this point in the stowage sequence, the top panel 66 and the front panel 72 of the deployment device 36 are brought down over the top and front of the folded canopy 14, as shown in FIG. 12. The rear pull apart securing strips 106 of the inner side panels 68 are secured to the corresponding rear pull apart securing strips 110 of the outer side panels 74. Thereafter, as shown in FIG. 13, the outer side panels 74 are brought around until their front pull apart securing strips 108, matched with and are adhered to the corresponding front pull apart securing strips 104 of the inner side panels 68, as shown in FIG. 13. Thereafter, as shown in FIG. 14, the bottom panel 76 is brought up under the bottom of the parachute canopy 14 and the reefing band 120 and the bottom panel extension 78 is laid over the front panel 72.

At this point, the closure retention loops 86 on the front panel 72 are passed through the upper grommets 90 while the reefed suspension lines 16 are together brought up and out from inside the bottom panel extension 78. The reefed suspension lines 16 are first folded over and the folds are inserted in the closure retention loops 86 to provide a disengageable securing means holding the deployment device in container-like configuration wrapped about the parachute canopy 14. The suspension lines 16 are then folded back and forth in accordion fashion and the folds are stowed in the stowage loops 88, as shown in FIG. 15. The line stowage cover panel 64 is then brought over to cover the stowed retaining line 16 and is secured in position by means of the pull apart connection 82. The fully stowed parachute, as shown in FIG. 16, is then ready for connection to the risers 20, as shown in FIG. 1, and for packing in the outer pack 44, as shown in FIGS. 2 and 3.

At this point, the stowing operation is complete. It should be understood that the arrangements above described permit the parachute to be stowed by the folding of its canopy according to any desired folding pattern inasmuch as the deployment device is not put together until after the folding operation has been completed. The provision of a deployment device which is wrapped around the parachute canopy after it is fully folded also ensures that the folds of the parachute canopy will not be distorted once it is inside the deployment device. A further feature of the above-described stowage arrangement lies in the fact that the deployment device may be pulled as tightly as desired about the completely folded parachute canopy. Thus, by using wide pull apart strips 104, 106, 108 and 110, adjustments may be made for any differences in the size of the folded parachute canopy, which may be due, for example, either to different folding techniques or different sizes and shapes of canopies.

The deployment sequence of a parachute which has been stowed as described above, is shown in FIGS. 17-23 FIG. 17 illustrates the position of a parachutist immediately after he has pulled on the ripcord 54 (shown in FIG. 2), to open his parachute pack 44 (as indicated in FIG. 3). At this point, the pilot parachute 34 springs out behind the parachutist 10 and immediately assumes a fully opened condition, as shown in FIG. 17, by virtue of the internal spring contained within the pilot parachute. This permits the atmosphere to impose a drag on the pilot parachute and the drag in turn produces an upward pull on the bridle 38. The bridle pull is transmitted to the deployment device 36 via the reinforcing webbing 62. As a result, the entire deployment device 36 is pulled up and away from the parachutist 10 so that the risers 20 (which are attached to his harness 22, as shown in FIG. 1) become fully extended. As the pilot parachute 34 continues to pull the deployment device 36 away from the parachutist 10, the risers 20 exert a counteracting pull on the suspension lines 16. This pull begins to pull the suspension lines out of the rows of stowage loops 88. This action takes place very rapidly and is somewhat violent, and as a result, the line stowage cover panel is caused to pull back from the pull apart connection 82 and thereby expose the entire stowed suspension lines 16. The action of the air stream created by the rapidly downwardly moving parachutist and deployment device will also assist in causing the cover panel 64 to be pulled away, as shown in FIG. 19.

As the suspension lines 16 become unstowed, they pull out successively from the lowermost of the stowage loops 88 toward the upper loop until finally they pull loose from the two closure retention loops 86, as shown in FIG. 20. Since the closure retention loops 86 are actually attached to the front panel 72 of the deployment device, and since these loops pass through the upper grommets 90 of the bottom panel extension 78, the presence of the suspension lines 16 in the loops 86 serves to lock the bottom panel extension 78 in place, as shown in FIG. 20. However, after the suspension lines 16 are fully extended, they finally pull out from the upper retainer loops 86, as shown in FIG. 21, and allow the bottom panel extension 78 and the bottom panel 76 to extend downwardly, as shown in FIG. 21. It is only at this point that the deployment device panels will begin to separate to release the parachute canopy.

As shown in FIG. 21, with the bottom panel 76 and the bottom panel extension thus separated, the bottom of the deployment device 36 is thus opened so that the parachute canopy 14 can begin to emerge and become unfolded. At the same time, the pulling force of the pilot parachute 34 is transferred from a pull on the deployment devices and parachute canopy as an integral unit to a direct pull on the canopy 14 itself. Thus the pilot parachute serves to pull the canopy from a folded to an unfolded and extended condition. During this time airstream forces may be produced within the canopy and/or the deployment device 36. In such case, the pull apart securing strips 106 and 108 can release so that the inner and outer side panels 68 and 74 become separated, as shown in FIG. 22. Eventually, as shown in FIG. 23, the entire parachute canopy 14 becomes extended, and at the same time, the deployment device 36 becomes fully separated to its flattened condition. The suspension lines 16, however, remain reefed by means of the reefing band 120 and the locking pin 122, while the locking pin trigger line 124 extends up inside of the canopy 14 to the deployment device 36. The deployment device 36 is then pulled further away from the canopy 14 by means of the pilot parachute 34 until the retainer line to is fully extended. Part way along this movement, the trigger line 124 pulls on the elements 126 causing them to separate. Continued upward movement of the trigger line 124 will pull the locking pin 122 out from the reefing band 120 to release the band and allow the suspension lines 16 to part. The parachute then becomes fully opened, as shown in FIG. 27. The precise point in the deployment sequence at which the reefing band 120 becomes opened will, of course, be determined by the length of the trigger line 124. This can be adjusted at will.

It will be appreciated that the deployment device 36 in the above-described arrangement, does not remain close to the body of the parachutist 10, but instead is immediately pulled away from the parachutist 10 while the suspension lines 16 are caused to release gradually from the deployment device itself. Moreover, the deployment device is constructed so that its various panels will remain together to prevent deployment of the canopy of the parachute until the suspension lines thereof have become fully extended. Further, the deployment device, by undergoing a staged separation, serves to permit the canopy 14 to extend and expand in a more progressive sequence than has heretofore been attainable. Also, because the deployment device can separate, as described above, it insures a more safe and complete opening of the parachute canopy.

It will be noted that the pull-apart strips 104-107 which hold the inner and outer side panels 68 and 74 together during stowage, are arranged to extend vertically from top to bottom of the deployment device; and no fastening is provided along the lower edges of these panels. This permits air to be forced up between the inner and outer side panels as the device descends through the atmosphere just prior to deployment. The air entering between the adjacent panels can first force open the outer panels 74 by separation of the front strips 104 and 108. Thereafter the inner side panels 68 can be forced open by separation of the rear strips 106 and 110.

As can be seen in FIG. 23 the parachute canopy 14 is fully extended and is essentially free from the confined of the deployment device 36. However the suspension lines 16 are still reefed by the band 120. This allows air gradually to seep in the restricted openings at the bottom of the canopy so that it begins to inflate at the top. As will be noted, the canopy 14 at this point resembles a widened exclamation point. The purpose for this arrangement is to provide a degree of increased drag by which the entire parachute system is slowed in its descent through the atmosphere prior to actual opening of the canopy. This reduces the large shock which is otherwise experienced when the canopy is suddenly fully exposed to an air stream while moving at high velocity.

FIGS. 24–26 show in greater detail the manner in which the suspension lines 16 become unreefed following extension of the canopy 14. As seen in FIG. 24, one end of the reefing band 120 is fitted with a buckle 140; and the other end of the band, which is in the form of a loop 142 is passed through an opening in the buckle 140. The locking pin 122 is inserted in the loop 142 and secured it to the buckle 140. The suspension lines 16 and the centerlines 28 are thus held together in reefed condition as shown in FIG. 27.

The trigger line 124 is secured to the parachute centerlines 28, as by a girth hitch 144 adjacent to the apex 24 of the parachute. The trigger line extends down to the securing elements 126 where it is attached to itself in pull apart fashion. It then continues to the band 120 where it is sewn (as seen in FIG. 27). The trigger line then extends to the locking pin 122 and back to the securing elements 126. From there the trigger line passes up inside the apex 24 of the parachute toward the deployment device as above described. The portion of the trigger line 124 which is attached to the band 120 and the release pin 122 is maintained in a rather loose configuration by the securing elements 126. This ensures that the pin will not be pulled out of the loop 142 prematurely.

As shown in FIG. 25 when the trigger line 124 experiences a pull of sufficient force from its upper end (as when the canopy 14 approaches complete extension) it first separates the pull apart securing elements 126. Continued upward pull on the trigger line extracts the pin 122 (as shown in FIG. 26) and releases the band 120. This allows the suspension lines 16 to unreef which in turn permits fuller extension of the canopy.

The final and complete extension of the canopy (shown in FIG. 28) results in a pulling of both the trigger pin 122 and the band 120 up inside the apex 24. In the inverted canopy type parachute shown, the apex 24 is opened to a diameter of about 12 inches and is bridges by lines 150 which extend along the fabric of the canopy 14 and form continuations of the suspension lines 16. Thus in the inverted apex type parachute it becomes possible to pull the entire reefing arrangements up out of influence with the aerodynamic action of the canopy.

Similarly, as can be seen in FIG. 28, the deployment device 36 and the pilot parachute 34 are held close to the crown lines 28 of the opened canopy where they will exert minimum aerodynamic effects on the canopy. They may, in fact actually fall down under the crown lines and into the apex region. This close securing of the deployment device is made possible by virtue of the fact that it completely separates into a flattened configuration so that the upper regions of the parachute canopy, rather than being pulled out and away from the deployment device are instead exposed by the opening of the deployment device to a flattened condition.

It has been found in actual practice that the deployment devices 36 may not actually separate to a fully flattened condition upon deployment of the parachute. However even in such cases the deployment device will not interfere with the opening of the canopy, but it will instead merely collapse into a compact unit. Then the deployment device either will rest on top of the canopy, or in some cases, it will fall down through the crown lines of an inverted apex canopy and be held with the pilot parachute in a completely non-interfering arrangement within the inverted apex.

There are certain additional modifications which are especially advantageous with the novel stowage and deployment arrangements described above.

Reverting to FIG. 4, it will be seen that a sleeve 160 is mounted on the portion of the bridle 38 just below the grommet 94. This sleeve extends over the quick release hook 90 and protects against inadvertent fouling of various parts of the parachute assembly both during stowage and during deployment.

Another modification which may be used advantageously is a pilot parachute assister shown at 170 in FIG. 16. This assister, comprises a skirt of flexible material, e.g. the same material as used in the deployment device 36; and this skirt is sewn to the regions of the reinforcing webs 62 above the top panel 66. The assister is open at the bottom and closed at the top and will billow upon rapid downward movement of the deployment device 36.

The assister 170 may be used as a reserve safety device to take over the functions of the pilot parachute and pull the deployment device away from the parachutist it for some reason the pilot parachute fails to function properly or becomes detached. Also the assister will operate, even when the pilot parachute functions properly, to provide a stabilizing influence on the deployment device thereby increasing the overall reliability and smoothness of the deployment system.

Having described the invention with particularity with reference to the preferred embodiment of the same, and having referred to some of the possible modifications thereof, it will be obvious to those skilled in the art, after understanding the invention, that other changes and modifications may be made therein without departing from the spirit and scope of the invention; and the appended claims are intended to cover such changes and modifications as are within the scope of the invention.

What is claimed is:

1. A method of stowing a parachute-type device having a flexible sheet-like canopy and a plurality of suspension lines extending therefrom, said method comprising the steps of first extending said suspension lines and thereafter folding said canopy over on itself to form a compact bundle, connecting the top of said canopy through a top flap of a multiple flap separable deployment container, in opened condition, to a pilot parachute, thereafter enveloping the entire canopy in folded condition inside said container by bringing side flaps of the container tightly around the folded over canopy and securing each side flap to another flap of the container, thereafter closing a bottom flap of said container and securing same with a portion of said suspension lines, and stowing the remainder of said suspension lines outside said deployment device in a manner permitting deployment of said lines by application of tension thereto.

2. A method according to claim 1, wherein said flaps are integrally interconnected to and extend outwardly from a back panel and said flaps and panel are laid out flat with said canopy positioned thereon prior to folding and wherein after folding of said canopy, said flaps are brought around and over said canopy and secured together.

3. A method of deploying a parachute-type device comprising a folded flexible canopy to which are attached, at selected locations, a plurality of suspension lines, said method comprising the steps of pulling on the entire folded canopy while maintaining same in completely folded condition enveloped within a separable deployment container, thereby to unstow and extend said suspension lines, thereafter opening the bottom of the container and holding the top of said canopy up inside said container while continuing to pull upwardly thereon so that said canopy unfolds and inflates from the bottom thereof within said container as it exits from the bottom of the container, said deployment container comprising a plurality of flaps having pull apart securing means along their edges whereby said flaps are held to each other while wrapped about said canopy to hold same in folded condition and wherein, upon release of said canopy, said flaps are pulled apart along their edges.

4. A method according to claim 3, wherein said deployment container is wrapped about said canopy and is secured to itself to hold said canopy and wherein said canopy is released by releasing a flap on said deployment container.

5. A method according to claim 3, wherein said suspension lines are held reefed together until said canopy becomes fully extended and then said lines are released.

6. A method according to claim 5, wherein said lines are held by a reefing band encircling same and arranged to be released by a pull on a release element and wherein said lines are released by exerting a pull from said deployment container via a trigger line to said release element.

7. A deployment container for a parachute having a foldable flexible canopy and suspension lines attached to said canopy, said container comprising flexible back, top, side and bottom flaps, at least said side flaps having pull-apart securing means thereon permitting said back, top and side flaps to be wrapped about a fully folded parachute canopy and permitting each side flap to be secured to another flap in a manner permitting said securing means to pull apart for separation of said flaps in response to expansion forces outwardly from such folded parachute within the container, parachute suspension line stowage means mounted on the outside of said container and means for locking said bottom flap in closed position on said container with a loop formed from a portion of a suspension line outside the container.

8. A deployment container according to claim 7, wherein said pull apart securing means includes two elements constructed to provide mechanical adhesion upon pressing of said two elements together.

9. A deployment container according to claim 8, wherein one of said two elements comprises a plurality of burred elements of a harder material and the other element comprises a closely packed softer fibrous material.

10. A deployment container according to claim 7, wherein said pull apart securing means is in the form of elongated strips extending along the edges of said flaps.

11. A deployment container according to claim 7, wherein said flaps comprise a plurality of flaps of a fabric-like flexible material.

12. A deployment container according to claim 11, wherein at least one of said flaps has a parachute suspension line stowage loop attached thereto positioned to be pulled through an opening in an overlapping flap whereby a parachute suspension line can be stowed in said loop to hold said flaps secured to each other.

13. A deployment container according to claim 7, wherein said deployment device includes a central generally rectangular back panel having a top panel, a pair of side panels and a bottom panel extending from the different edges thereof, and a front panel extending from the edge of the top panel opposite said side panels.

14. A deployment container according to claim 13, wherein said pull apart securing means is arranged along the edges of said side panels extending from the bottom to the top panels and wherein the bottom edges of the side panels are left unsecured to permit entry of an airstream for generation of opening forces.

15. A deployment container according to claim 13, wherein said bottom panel has an extension connected thereto opposite said back panel to overlie said front panel and wherein a suspension line reefing loop is secured to said front panel for passage through an opening in said extension.

16. A deployment container according to claim 15, wherein said top and front panels have a pair of inner side panels integrally connected thereto and wherein said pull apart securing means extends in the form of strips along the mutually facing edge surfaces of each inner and outer side panel from top to bottom.

17. A deployment container according to claim 7, further including an assister comprising a flexible skirt closed at the top and open at the bottom and secured to the outside of said deployment device and oriented to billow and exert a pulling force on said device away from said suspension lines as said device falls through the atmosphere.

18. In combination, a parachute deployment device comprising a plurality of flaps of a flexible fabric-like material, pull-apart fastening means along the edges of said flaps for holding said flaps together in a container-like configuration within which a folded parachute canopy may be maintained, a pilot parachute external to said deployment device, a bridle line interconnecting said pilot parachute and said deployment device, said flaps having reinforcing webbing secured thereto to form a harness arrangement whereby said deployment device may be pulled upon as a unit without immediately becoming pulled apart, said bridle line being secured to said reinforcing webbing, and a quick release hook connected to said reinforcing webbing for securing of a parachute canopy to be pulled by said pilot parachute upon opening of said deployment device.

19. A combination according to claim 18, wherein said bridle line is secured directly to the deployment device and wherein said bridle line extends into the interior of said deployment device for attachment to a parachute canopy contained therein.

20. In combination, a parachute deployment device constructed and arranged to contain a folded parachute canopy, a parachute suspension line reefing band constructed to be secured about the suspension lines of a parachute for holding same in reefed arrangement, a release element for releasing said band in response to a pulling force, a trigger line connected between said release element and said parachute deployment device, said band and said release element being both connected to said trigger line whereby a pull on said trigger line will release said band and free said band completely from said suspension lines, and pull-apart securing means on said trigger line for detachably securing said trigger line to itself at locations on opposite sides of said release element.

21. A parachute reefing device comprising a reefing band for encircling the suspension lines of a parachute, a release element for holding said band in a closed loop and responsive to a pulling force to release said band from its looped configuration, a trigger line permanently connected at displaced locations therealong to both said band and to said release element and pull apart securing means for detachably securing said trigger line to itself at locations on opposite sides of said release element.

22. In combination, a folded parachute canopy, a parachute deployment device for containing said canopy, releasable securing means holding said folded canopy contained in said deployment device, means for stowing suspension lines extending from given locations on said folded canopy, said last-mentioned means forming an operative portion of said releaseable securing means to permit release of said canopy upon completion of unstowing of said suspension lines, a pilot parachute, first connecting means directly connecting said deployment device to said pilot parachute, second connecting means directly connecting said folded canopy, at a location thereon remote from said given locations, to said deployment device, said second connecting means comprising a quick release hook on said first connecting means and a flexible sleeve surrounding said quick release hook.

23. In combination, a deployment container and a parachute having a folded flexible canopy and suspension lines attached to said canopy, said deployment container comprising flexible back, top, side and bottom flaps, at least said side flaps having pull-apart securing means thereon permitting said back, top and side flaps to be wrapped about said fully folded parachute canopy and permitting each side flap to be secured to another flap in a manner permitting said securing means to pull apart for separation of said flaps in response to expansion forces outwardly from such folded parachute canopy within the container, parachute suspension line stowage means mounted on the outside of said container and means for locking from a portion of a suspension line outside the container, a pilot parachute outside said deployment container and means extending from said pilot parachute through the top flap of said deployment container and connecting said pilot parachute to the top of said canopy within said container.

* * * * *